(12) United States Patent
Stubbs et al.

(10) Patent No.: US 12,355,658 B2
(45) Date of Patent: Jul. 8, 2025

(54) ENERGY EFFICIENT WIRELESS NETWORK OF SENSORS

(71) Applicant: Butlr Technologies, Inc., Burlingame, CA (US)

(72) Inventors: Andy Stubbs, Waltham, MA (US); Tengfei Chang, Canton (CN); Ziran Zhang, Fremont, CA (US); Jiani Zeng, San Francisco, CA (US); Honghao Deng, Belmont, CA (US)

(73) Assignee: Butlr Technologies, Inc., Burlingame, CA (US)

( * ) Notice: Subject to any disclaimer, the term of this patent is extended or adjusted under 35 U.S.C. 154(b) by 76 days.

(21) Appl. No.: 18/366,916

(22) Filed: Aug. 8, 2023

(65) Prior Publication Data

US 2025/0055785 A1    Feb. 13, 2025

(51) Int. Cl.
   *H04L 45/00* (2022.01)
   *G16Y 10/75* (2020.01)
   *H04L 45/02* (2022.01)

(52) U.S. Cl.
   CPC .............. *H04L 45/22* (2013.01); *H04L 45/02* (2013.01); *G16Y 10/75* (2020.01)

(58) Field of Classification Search
   CPC .......... H04L 45/22; H04L 45/02; G16Y 10/75
   See application file for complete search history.

(56) References Cited

U.S. PATENT DOCUMENTS

| | | |
|---|---|---|
| 5,703,367 A | 12/1997 | Hashimoto et al. |
| 7,570,805 B2 | 8/2009 | Gu |
| 8,115,641 B1 | 2/2012 | Dempsey |

(Continued)

FOREIGN PATENT DOCUMENTS

| | | | | |
|---|---|---|---|---|
| AU | 2014268207 A1 | * | 6/2015 | ............. E21B 47/12 |
| CN | 205299832 | | 6/2016 | |

(Continued)

OTHER PUBLICATIONS

USPTO; Notice of Allowance dated Jun. 12, 2024 in U.S. Appl. No. 17/708,493.

(Continued)

*Primary Examiner* — Emmanuel L Moise
*Assistant Examiner* — Mariegeorges A Henry
(74) *Attorney, Agent, or Firm* — SNELL & WILMER L.L.P.

(57) ABSTRACT

The system includes a wireless network that combines the functionality of the sensors with the formation and maintenance of the network, while balancing the network with the minimization of the energy consumed by the entire system. The system may include nodes, gateways, coordinators, extension sensors and boosters. The system may perform a method comprising applying a known load to a battery in a first node; measuring a voltage drop in the battery; determining an internal resistance of the battery; estimating a remaining life in the battery based on the internal resistance; and in response to the remaining life being below a remaining life threshold, re-directing, by a first gateway, signals in (Continued)

a mesh network away from the first node and to one or more of a plurality of nodes interfacing with the first node, wherein the first gateway interfaces with the first node and a network.

20 Claims, 6 Drawing Sheets

(56) References Cited

U.S. PATENT DOCUMENTS

| | | | |
|---|---|---|---|
| 8,718,748 | B2 | 5/2014 | Reinhold |
| 9,274,204 | B2 | 3/2016 | Kim et al. |
| 9,439,145 | B2* | 9/2016 | Van Greunen .... H04W 52/0206 |
| 9,534,958 | B1 | 1/2017 | Lhamon et al. |
| 9,665,776 | B2 | 5/2017 | Klehorst et al. |
| 9,860,677 | B1* | 1/2018 | Agerstam ............... H04L 67/56 |
| 10,019,962 | B2 | 7/2018 | Liu et al. |
| 10,127,342 | B2 | 11/2018 | Xin et al. |
| 10,171,891 | B1* | 1/2019 | Stamatakis ............ H04W 84/18 |
| 10,680,899 | B1* | 6/2020 | Ibarra ..................... H04L 45/02 |
| 11,022,495 | B1 | 6/2021 | Deng et al. |
| 11,080,891 | B2 | 8/2021 | Kim et al. |
| 11,252,329 | B1* | 2/2022 | Cier ....................... H04N 23/53 |
| 11,644,363 | B2 | 5/2023 | Deng et al. |
| 2001/0006367 | A1 | 7/2001 | Oda |
| 2004/0254472 | A1 | 12/2004 | McQuilkin |
| 2006/0034232 | A1 | 2/2006 | McLaughlin et al. |
| 2008/0253386 | A1* | 10/2008 | Barum .................. H04W 40/16 370/406 |
| 2011/0019560 | A1 | 1/2011 | Karaoguz et al. |
| 2012/0253201 | A1 | 10/2012 | Reinhold |
| 2012/0263357 | A1 | 10/2012 | Xu et al. |
| 2014/0005810 | A1 | 1/2014 | Frei et al. |
| 2015/0097680 | A1 | 4/2015 | Fadell et al. |
| 2015/0164391 | A1 | 6/2015 | Hernandez-Rosas et al. |
| 2015/0316419 | A1 | 11/2015 | Punnakkal |
| 2015/0324656 | A1 | 11/2015 | Marks et al. |
| 2015/0334315 | A1 | 11/2015 | Teich et al. |
| 2016/0011053 | A1 | 1/2016 | Katz |
| 2016/0021040 | A1 | 1/2016 | Frei et al. |
| 2016/0195856 | A1 | 7/2016 | Spero |
| 2016/0217326 | A1 | 7/2016 | Hosoi |
| 2017/0053169 | A1 | 2/2017 | Cuban et al. |
| 2017/0172473 | A1 | 6/2017 | Wedekind et al. |
| 2017/0303177 | A1* | 10/2017 | Ngounou ............... H04W 48/20 |
| 2017/0350946 | A1* | 12/2017 | Mukaitani ........... H01M 10/486 |
| 2018/0150903 | A1 | 5/2018 | Waldron et al. |
| 2019/0104056 | A1 | 4/2019 | Poorrezaei et al. |
| 2019/0332901 | A1 | 10/2019 | Doumbouya et al. |
| 2020/0048604 | A1 | 2/2020 | Goldman et al. |
| 2020/0074175 | A1 | 3/2020 | Zheng et al. |
| 2020/0074373 | A1 | 3/2020 | Adato et al. |
| 2020/0077892 | A1 | 3/2020 | Tran |
| 2020/0175330 | A1 | 6/2020 | Wang et al. |
| 2020/0252233 | A1 | 8/2020 | O'Keeffe |
| 2021/0049887 | A1 | 2/2021 | Hanson et al. |
| 2021/0278279 | A1 | 9/2021 | Honghao et al. |
| 2021/0279967 | A1 | 9/2021 | Gernoth et al. |
| 2021/0398659 | A1 | 12/2021 | Sharma et al. |
| 2022/0044441 | A1 | 2/2022 | Kalra et al. |

FOREIGN PATENT DOCUMENTS

| | | | |
|---|---|---|---|
| CN | 105793904 | | 7/2016 |
| CN | 107358166 | | 11/2017 |
| CN | 209197910 | | 8/2019 |
| CN | 110726476 | | 1/2020 |
| CN | 115580912 | A * | 1/2023 |
| EP | 716402 | | 6/1996 |
| EP | 1027816 | B1 * | 8/2004 ............ H04L 47/10 |
| JP | H08161292 | | 6/1996 |
| JP | 2007292651 | | 11/2007 |
| JP | 2017190967 | | 10/2017 |
| JP | 2019158756 | | 9/2019 |
| WO | 2002033558 | | 4/2002 |
| WO | 03088672 | | 10/2003 |
| WO | 2015061532 | | 4/2015 |
| WO | 2016008430 | | 1/2016 |
| WO | 2018056894 | | 3/2018 |
| WO | 2021178145 | | 9/2021 |

OTHER PUBLICATIONS

CNIPA, Rejection Decision dated Jun. 7, 2024 in Application No. 202180031907.2.
CIPO, Exam Report dated Jun. 6, 2024 in Application No. 3170582.
UKIPO, United Kingdom Intent to Grant dated May 16, 2024 in Application No. 22128250.
CIPO, Exam Report dated Feb. 8, 2024 in Application No. 3170582.
CNIPA, Second Office Action dated Feb. 8, 2024 in Application No. 202180031907.2.
USPTO; Supplemental Notice of Allowance dated Dec. 27, 2023 in U.S. Appl. No. 18/194,880.
UKIPO, United Kingdom Exam Report dated Nov. 9, 2023 in Application No. 22128250.
USPTO; Non-Final Office Action dated Mar. 5, 2024 in U.S. Appl. No. 17/708,493.
IPEA; International Preliminary Report on Patentability dated Mar. 5, 2024 in PCT/US2023/013980.
ISA; International Search Report and Written Opinion dated Oct. 10, 2024 in PCT/US2024/039406.
AUIPO, Second Examination Report dated Nov. 27, 2024 in Application No. 2023248184.
AUIPO, Examination Report dated Aug. 13, 2024 in Application No. 2023248184.
ISA; International Preliminary Report on Patentability dated Jan. 28, 2022 in PCT/US2021/018661.
ISA; International Search Report and Written Opinion dated Jun. 8, 2021 in PCT/US2021/018661.
USPTO, Notice of Allowance dated Apr. 15, 2021 in U.S. Appl. No. 17/178,784.
USPTO, Notice of Allowance dated Feb. 7, 2022 in U.S. Appl. No. 17/516,954.
GB; Examination Report under Section 18(3), dated Oct. 26, 2022, in Application No. GB2212825.0.
USPTO, Non-Final Office Action, dated Nov. 21, 2022, 2023 in U.S. Appl. No. 17/232,551.
USPTO, Notice of Allowance dated Jan. 27, 2023 in U.S. Appl. No. 17/232,551.
CIPO, Examination Report dated Dec. 9, 2022 in Canadian Application No. 3,170,582.
CIPO, Combined Office Action and Examination Search Report dated Feb. 10, 2023 Application No. 3,170,582.
JPIPO, Notice of Allowance dated May 6, 2023 Application No. 2022-552886.
AUIPO, Notice of Acceptance dated Nov. 9, 2022 Applicaton No. 2021231676.
AUIPO, Notice of Acceptance dated Jan. 24, 2023 Application No. 2022275481.
USPTO, Supplemental Notice of Allowance dated Feb. 6, 2023 in U.S. Appl. No. 17/232,551.
USPTO, Non-Final Office Action dated Mar. 15, 2023 in U.S. Appl. No. 17/711,953.
USPTO, Notice of Allowance dated May 22, 2023 in U.S. Appl. No. 17/711,953.
CNIPA, First Office Action dated May 9, 2023 in Application No. 202180031907.2.
ISA; International Search Report and Written Opinion dated Jun. 2, 2023 in PCT/US23/13980.
AUIPO, First Office Action dated May 12, 2023 Application No. 2023202347.
AUIPO, Notice of Grant dated May 18, 2023 Application No. 2022275481.
Berry, Park, "A Passive System for Quantifying Indoor Space Utilization", ACADIA 2017, Disiplines + Disruption, pp. 138-145.
Chen et al., "A fall detection system based on infrared array sensors with tracking capability for the elderly at home", 2015 17th Inter-

(56) References Cited

OTHER PUBLICATIONS national Conference on E-health Networking, Application & Services, (HealthCom), Department of Electrical Engineering, National Tsing Hua University, Apr. 19, 2015, pp. 428-434, Hsinchu, Taiwan.

Chen et al., "Unobtrusive Sensor based Occupancy Facing Direction Detection and Tracking using Advanced Machine Learning Algorithms", IEEE Sensors Journal, Aug. 11, 2018, pp. 1-9, vol. 18, Issue: 15.

Hao, "Multiple Human Tracking and Identification With Wireless Distributed Pyroelectric Sensors", 2006, Dissertation submitted—Department of Electrical and Computer Engineering—Duke University, pp. 1-184.

Honghao Deng, et al., U.S. Appl. No. 17/178,784, filed Feb. 18, 2021 entitled "Monitoring Human Location, Trajectory and Behavior Using Thermal Data," 62 pages.

Honghao Deng, et al., U.S. Appl. No. 17/232,551, filed Apr. 16, 2021 entitled "Thermal Data Analysis for Determining Location, Trajectory and Behavior," 50 pages.

Kallur, "Human localization and activity recognition using distributed motion sensors." Diss. Oklahoma State University, 2014 (2014), entire document, especially pp. 35, 37, 40[online] <https://shareok.Org/bitstream/handle/11244/14924/Kallur_okstate_0664M_13505.pdf?sequence=1>.

Mikkilineni et al., "A novel occupancy detection solution using low-power IR-FPA based wireless occupancy sensor", Mar. 11, 2019, pp. 1-37, Energy and Buildings, Elsevier.

Shetty et al. "Detection and tracking of a human using the infrared thermopile array sensor—"Grid-EYE"", 2017 International Conference on Intelligent Computing, Instrumentation and Control Technologies, ICICICT, 2017, pp. 1490-1495.

Yuan et al., "Human indoor location for binary infrared sensor tracking system: On improved credit and dynamic pruning algorithm", ISA Transactions, Apr. 19, 2019, pp. 1-9, Published by Elsevier Ltd on behalf of ISA.

Yun et al., "Detecting direction of movement using pyroelectric infrared sensors", IEEE Sensors Journal, May 2014, pp. 1482-1489, vol. 14, No. 5.

AUIPO, Notice of Acceptance dated Jul. 3, 2023 Application No. 2023202347.

CIPO, Canadian Exam Report dated Aug. 31, 2023 in Application No. 3170582.

UKIPO, United Kingdom Exam Report dated Aug. 22, 2023 in Application No. 22128250.

CNIPA, Chinese Second Office Action dated Oct. 12, 2023 in Application No. 202180031907.2.

USPTO, Non-Final Office Action dated Oct. 25, 2023 in U.S. Appl. No. 18/194,880.

JPO; Decision to Grant a Patent dated Jul. 2, 2024 in Japanese Application No. 2023066316.

UKIPO, United Kingdom Intent to Grant dated Jul. 24, 2024 in Application No. 22128250.

USPTO; Notice of Allowance dated Dec. 15, 2023 in U.S. Appl. No. 18/194,880.

\* cited by examiner

ENERGY EFFICIENT WIRELESS NETWORK OF SENSORS

FIELD

This disclosure generally includes a system with a wireless network of sensors, and more particularly, a system with a wireless network of sensors that minimizes energy consumption.

BACKGROUND

Many internet of things (IoT) systems use wireless networks that include a distribution of battery-powered sensors across an area. Such networks may be mesh sensor networks that are used to provide connections between entities or nodes in the network. Moreover, the networks are often designed with low power usage to use the least amount of power to transmit data, even at the expense of the bandwidth of the system.

The sensors may be configured to perform some level of acquiring data from the area and/or monitoring of the area. Such areas may not be near convenient sources of electrical power such as areas that are outside (e.g., construction sites, farms, mines, etc.). Moreover, the systems may include numerous sensors over large areas in a building or structure, wherein some sensors are very difficult to access. These networks should efficiently use battery power to conserve energy, such that the system as a whole may last for longer periods of time (e.g., years), without having to replace the batteries.

SUMMARY

The system includes a wireless network that combines the functionality of the sensors with the formation and maintenance of the network, while balancing the network with the minimization of the energy consumed by the entire system. The system may include nodes, gateways, coordinators, extension sensors and boosters. The system may perform a method that includes applying a known load to a battery in a first node; measuring a voltage drop in the battery; determining an internal resistance of the battery; estimating a remaining life in the battery based on the internal resistance; and in response to the remaining life being below a remaining life threshold, re-directing, by a first gateway, signals in a mesh network away from the first node and to one or more of a plurality of nodes interfacing with the first node, wherein the first gateway interfaces with the first node and a network.

The method may further comprise moving, by the coordinator, the one or more of the plurality of nodes to a second gateway to optimize energy, wherein the coordinator interfaces with the first gateway and the second gateway. The method may further comprise determining that the first node is a threshold distance from the one or more of the plurality of nodes; and sending a notification to a user interface to at least one of add or activate a booster in the mesh network, wherein the booster interfaces with the one or more of the plurality of nodes and the first gateway. The method may further comprise at least one of adding or activating a booster in the mesh network, in response to the first node being a threshold distance from the one or more of the plurality of nodes, wherein the booster interfaces with the one or more of the plurality of nodes and the first gateway. The method may further comprise re-routing messages from the first node to the booster. The method may further comprise adding an extension sensor interfacing with one or more of the plurality of nodes.

The one or more of the plurality of nodes may operate on at least one of a time slot or a frequency channel. The first gateway may be configured to provide beacon messages that enable at least one of the first node to connect to the first gateway or the one or more of the plurality of nodes to indirectly connect to the first gateway. The one or more of the plurality of nodes may re-broadcast beacon messages to allow other nodes to join a mesh network. The first node may report to the first gateway at least one of a quality of connection to the one or more of the plurality of nodes, the one or more of the plurality of nodes detected by the first node or signal strength of a message sent by the first node. The method may further comprise at least one of determining or adjusting the remaining life threshold based on receiving a selection of a time duration between battery replacement maintenance functions. The method may further comprise predicting the remaining life threshold based on a time duration between battery replacement maintenance functions. The re-directing the signals may be further based upon determining channels that have signal traffic at least one of above or below a traffic threshold. The method may further comprise determining a clear channel time (CCT) to determine that the signal traffic is below the traffic threshold. The re-directing the signals may be further based upon load balancing, in response to at least one of adding or removing a second gateway from the mesh network. The method may further comprise determining locations in the mesh network to add a second gateway, in response to the one or more of the plurality of nodes exceeding an energy threshold. The method may further comprise suggesting placement locations for at least one of the first node, the first gateway, a booster or the one or more of the plurality of nodes, based on wall information. The method may further comprise determining a radio frequency (RF) opaqueness in terms of RF transparency, based on a geometry of a room containing the mesh network.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

Figure 4:
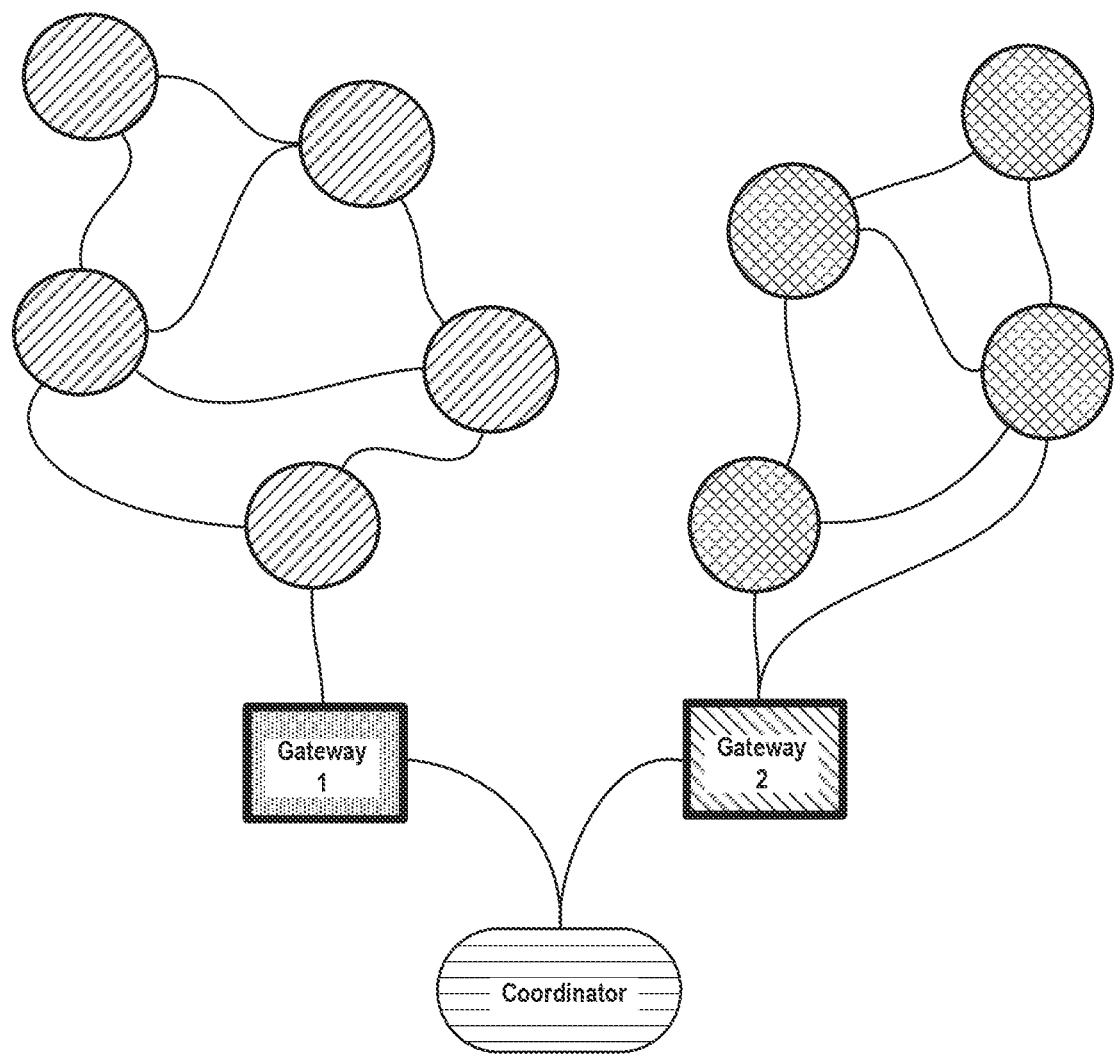
FIG. 4 shows an exemplary network showing the three layers of the system including nodes, gateways and a coordinator, in accordance with various embodiments.

In general, the system includes a wireless network that combines the functionality of the sensors with the formation and maintenance of the network, while balancing the network with the minimization of the energy consumed by the entire system. In various embodiments, and as shown in FIG. 4, the system may consist of three layers. The first layer may include nodes that communicate with each other. The second layer may include the gateways that communicate with nodes and communicate with other gateways. The third layer may include a coordinator that communicates with the gateways. Either (or any combination of) the sensor, gateway, booster, coordinator, extension sensor or network may perform any of the functions (or portions of functions) set forth herein. Moreover, while many of the components discussed herein may be described as wireless, the disclosure contemplates one or more of the components being wired in various embodiments.

In various embodiments, the gateway may comprise, for example, a CPU, a Bluetooth chipset and an ethernet (e.g., wifi and/or wired). The gateway may run the code that controls the system. The gateway may connect to one or more wireless "nodes." The gateway may connect itself to a first node (and/or subsequent nodes) forming a wireless network. The gateway may send the data collected from the nodes to the cloud. The gateway (e.g., via the non-sensor side of the network) may create a connection to a computer system. Such a connection may be a private network or the internet. The computer system may manipulate, compute, format, structure, store, analyze, record and/or parse the data.

In various embodiments, each of these nodes may represent one or more devices that receive and retransmit data on the network. The nodes may include devices that are typically wireless, but one or more of the devices may be wired. The devices may include one or more sensors. If the node does not include a device that provides sensor capabilities, then such a node may include a device known as a "booster". A sensor network may generally include two types of sensors. The first type of sensor involves an installation that includes the sensor in a specific position (e.g., camera viewing a specific area). The second type of sensor may have a desired general position, but the network is flexible in the location of the sensor (e.g., temperature sensor that may be located anywhere on the ceiling of a room). With respect to the network, both types of sensors may include the same connection. However, when the location of a sensor is flexible, the system may increase the performance of the network by moving the sensor.

Figure 6:
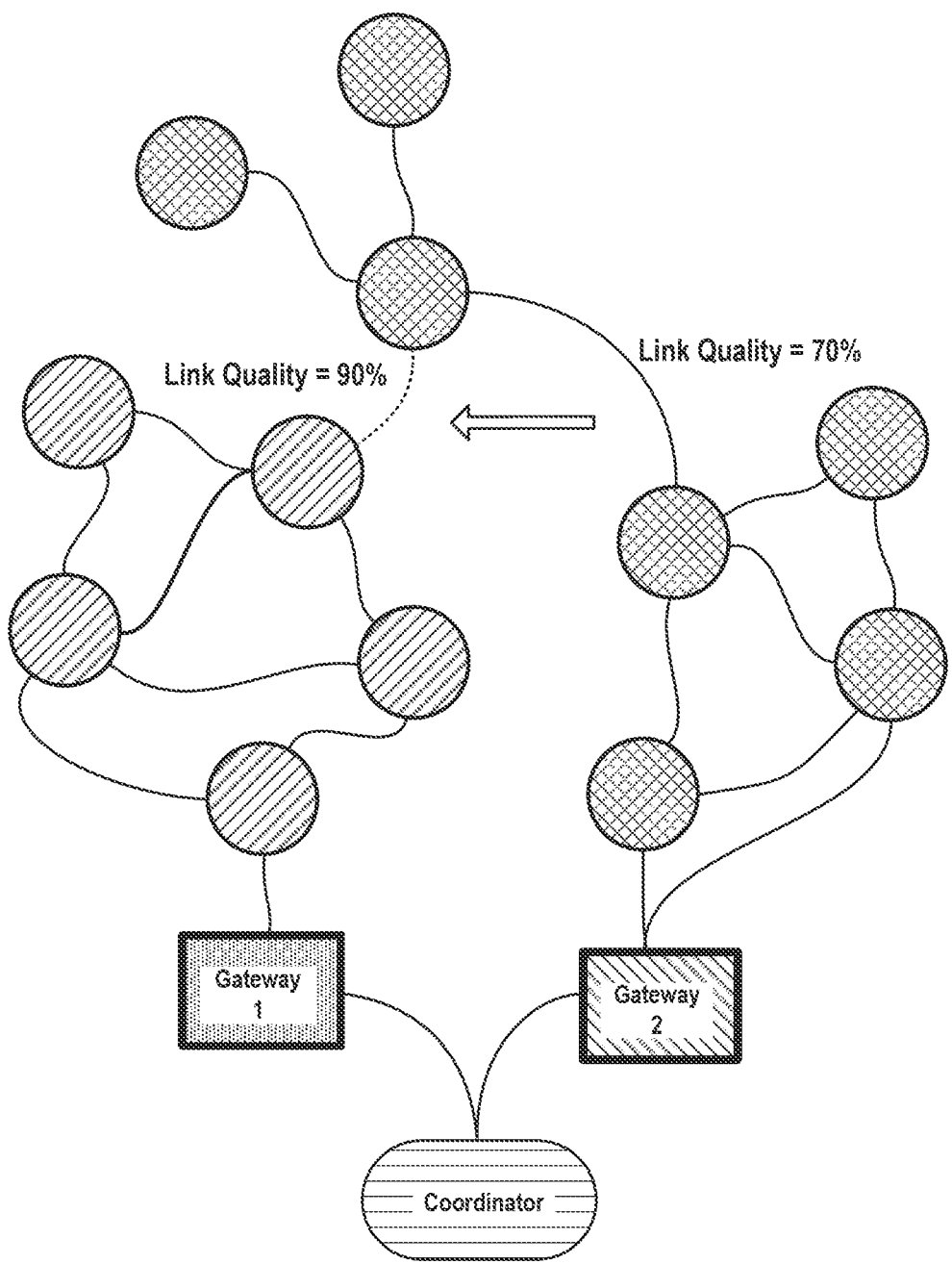
FIG. 6 shows an exemplary network having a coordinator that provides load balancing of the energy used for connectivity, in accordance with various embodiments.

The coordinator may run on the physical hardware of one of the gateways and/or the coordinator may run in the cloud. All or any subset of the information about the mesh network that is obtained by the gateways may be sent by the gateways to the coordinator. In various embodiments, the coordinator may consist of two components. A first component that maintains the state of the system, that may include the physical locations of the gateways and nodes in the building, any information known about the geometry and construction of the building, and the quality of the connections between each node and gateway. A second component may use this information to load balance the gateways and suggest physical improvements that the user can make to the system. In various embodiments, the coordinator may load balance the system. For example, the nodes may be scanning and receiving messages from the nodes that are in their vicinity. The nodes send this message information to the gateway the nodes are connected to. If a coordinator exists, the gateway sends these messages to the coordinator. The coordinator may examine the nodes to determine the strongest possible connections to nodes on another gateway. The strength of a connection may be determined by a combination of the predicted power used by the sensor and the sensor's network connection to the gateway, along with the number of dropped packets. As a result of the coordinator examining the nodes, the coordinator may obtain information about the node's relationship to the rest of the mesh network, so the coordinator may move certain nodes to another gateway. To move the nodes, the coordinator may instruct the gateway about what the sensor is connected to and command the sensor to connect to a node that it is on the new gateway's network. As shown in FIG. 6, the coordinator determines that the energy used for connectivity for three nodes may be reduced by moving the three nodes from gateway 2 to gateway 1. Based on that determination, the coordinator moves the three nodes from gateway 2 to gateway 1 to reduce the energy consumption.

The wireless network may include a time slot, which is a minimal unit of time used to exchange information between two nodes and the frequency channel architecture. The duration of a time slot may be the same across all entities in the system. The gateway may control the time slot timing. The gateway may also assign and/or control which nodes are on which channel. In response to activation of a gateway, the gateway may publish "beacon" messages for nodes to detect and connect to the gateway. In response to the nodes being connected to the gateway, the nodes may re-broadcast these "beacon" messages for other nodes to detect and use to connect to the network. A node (that is not the gateway) that first turns on may listen for beacons that are sent by the gateway (e.g., on multiple channels). In response to the node detecting one of these beacons on a channel, the node may send to the gateway a "request to join message". The join message may include a Media Access Control (MAC) unique address of the node. The gateway may respond to the node with a "join request" message. The nodes may inform the gateway the desired frequency channel and time slot for communications between the nodes and the gateway. The nodes may inform the gateway what nodes should connect to other nodes or what nodes should connect to the gateways to form the mesh network. In response to a node first coming online, the node listens for "beacon messages". If the Node hears only messages from one gateway, then the node connects to that gateway. If the node hears messages from multiple gateways, the node connects to the gateway with the strongest signal strength. The signal strength may be used in terms of Received Signal Strength Indicator (RSSI), as seen by the radio receiver.

In various embodiments, a node may report to the gateway the quality of its connections with other nodes, what nodes that the node may detect and/or the signal strength of the messages. In response to two nodes communicating, each receiving node may respond to each sent message with an acknowledgement (ACK) message with a message identifier and the RSSI that the message was received with. With this information, a sending node may determine the rate of dropped packets (no ACK received), the signal level messages are received with and the power used to transmit the messages. This information may be combined into the quality of the link. For example, links with high received RSSI and high dropped packet rates may be most likely dropping packets because of RF interference, as opposed to being too far away from each other. As such, the RSSI by itself may not be a complete indicator of link quality. The node may provide this information, even if the node is not connected to certain other nodes. If the first node is not connected to a second node, but the first node can hear that second node, then the first node and the second node are determined to be on separate gateways. In this example, the nodes may be connected via the gateway. Two nodes could be connected to the same gateway, but not each other. For example, the nodes may be on opposite sides of the gateway, so each node may be 10 m away from the gateway, but 20 m away from the other. Occasionally, a node may listen for beacons from other gateways and record the number of nodes seen and the signal strength. Beacons may be sent at the same periodicity (e.g., every 10 seconds), so in response to a node hearing a beacon on a specific channel, the number of times that the node should hear that beacon is known. Beacons may be sent at full transmit power, so an estimate of the quality of the beacon may be calculated and sent back to the gateway that the node is connected to. The quality of a connection between two nodes may include a combination of the signal strength of messages detected by a node and/or the percentage of messages that are acknowledged as received from that node. As part of the acknowledgement, a receiving node responds to a sending node with a message identifier and the RSSI of the signal strength of the message received. In response to the gateway instructing two nodes to form a connection and the two nodes completing the connection, the gateway and/or node may reduce the transmit power to conserve power and/or may increase the transmit power to improve the quality of the connection, as needed.

Figure 1:
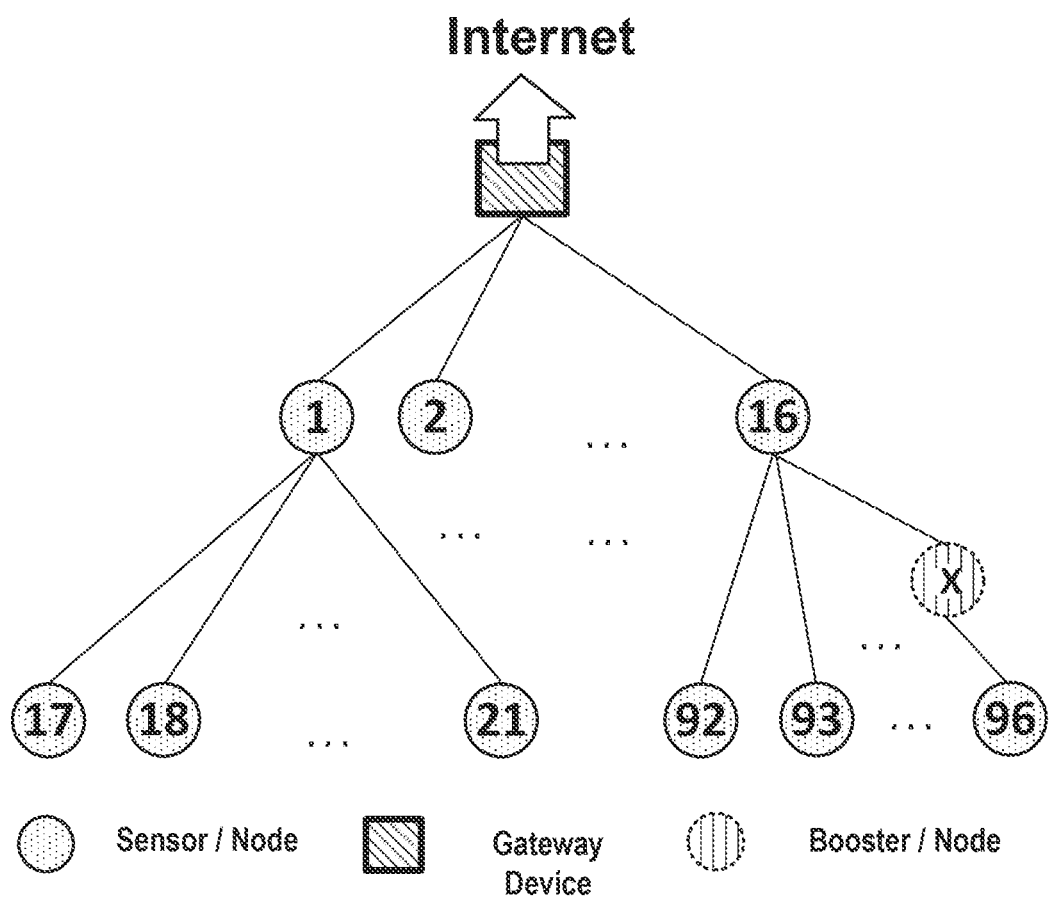
FIG. 1 shows an exemplary network with numerous sensors and multiple layers, in accordance with various embodiments.
Figure 2:
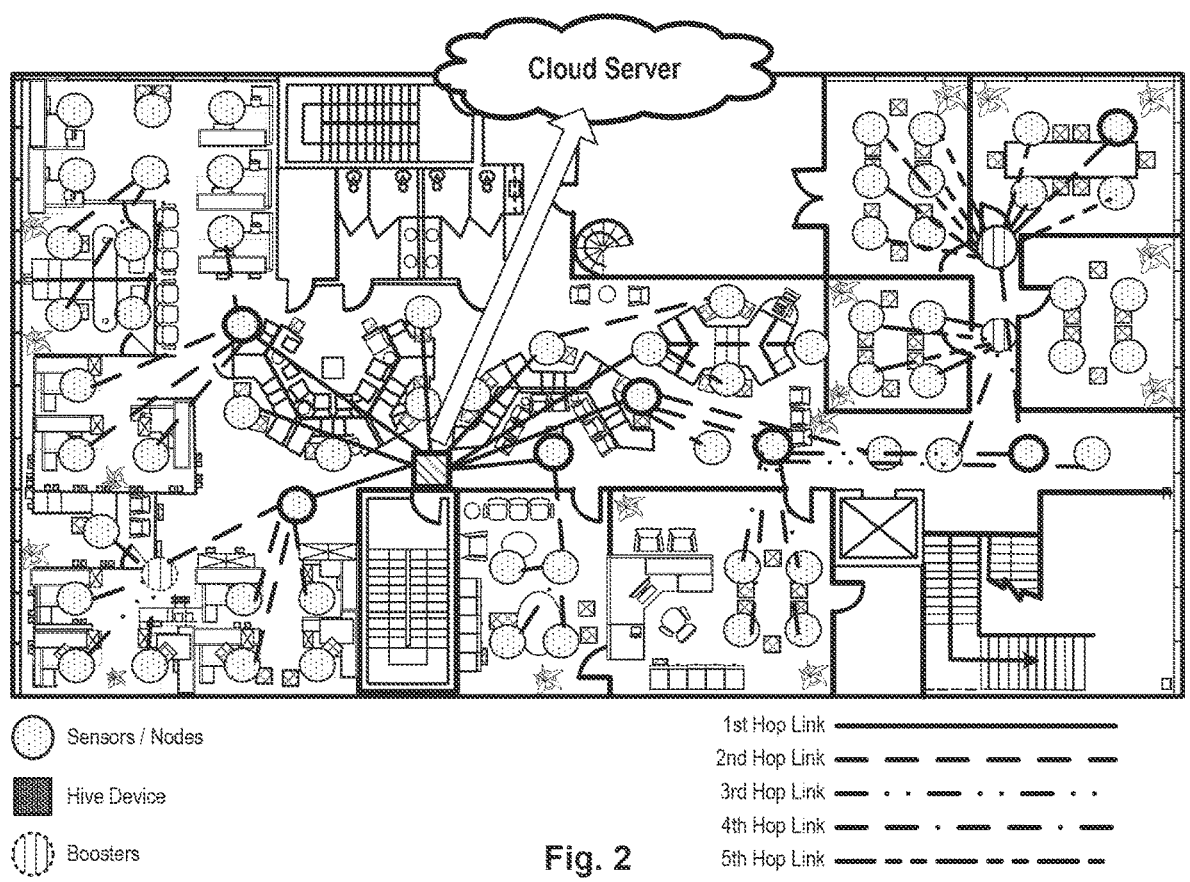
FIG. 2 shows an exemplary network in an office building with sensors that include multiple hops, in accordance with various embodiments.

FIG. 1 shows an exemplary network of 96 sensors that includes multiple layers. For example, sensor 1 connects sensors 17-21 to the gateway. As part of forming this type of network, in various embodiments, the structure of the network is such that some nodes use multiple hops to connect to the gateway. In other words, a "hop" may involve a first subnet of sensors communicating with one or more sensors that are part of a second subnet of sensors. All the sensors in the second subnet (in the example 17-21) talk to the node the sensors are connected to in the first subnet. The architecture is a snapshot in time, in that as the quality of the link between two nodes is determined, a node may switch subnets. For example, node 21 may switch from talking to node 1, and instead talk to node 2, if the gateway sees that the link between node 22 and the gateway is better through node 2 than node 1. The better connection may be determined by the quality of the link and the power used by the system. The system may also include load balancing of the power used by the system, as discussed later. The second subset of sensors may then communicate with one or more sensors that are part of a third subset of sensors, and so on. FIG. 2 shows an exemplary office building with sensors that form a network, wherein the network includes up to 5 hops. The system may also include extension boosters to allow the sensors to be placed further apart.

Figure 3:
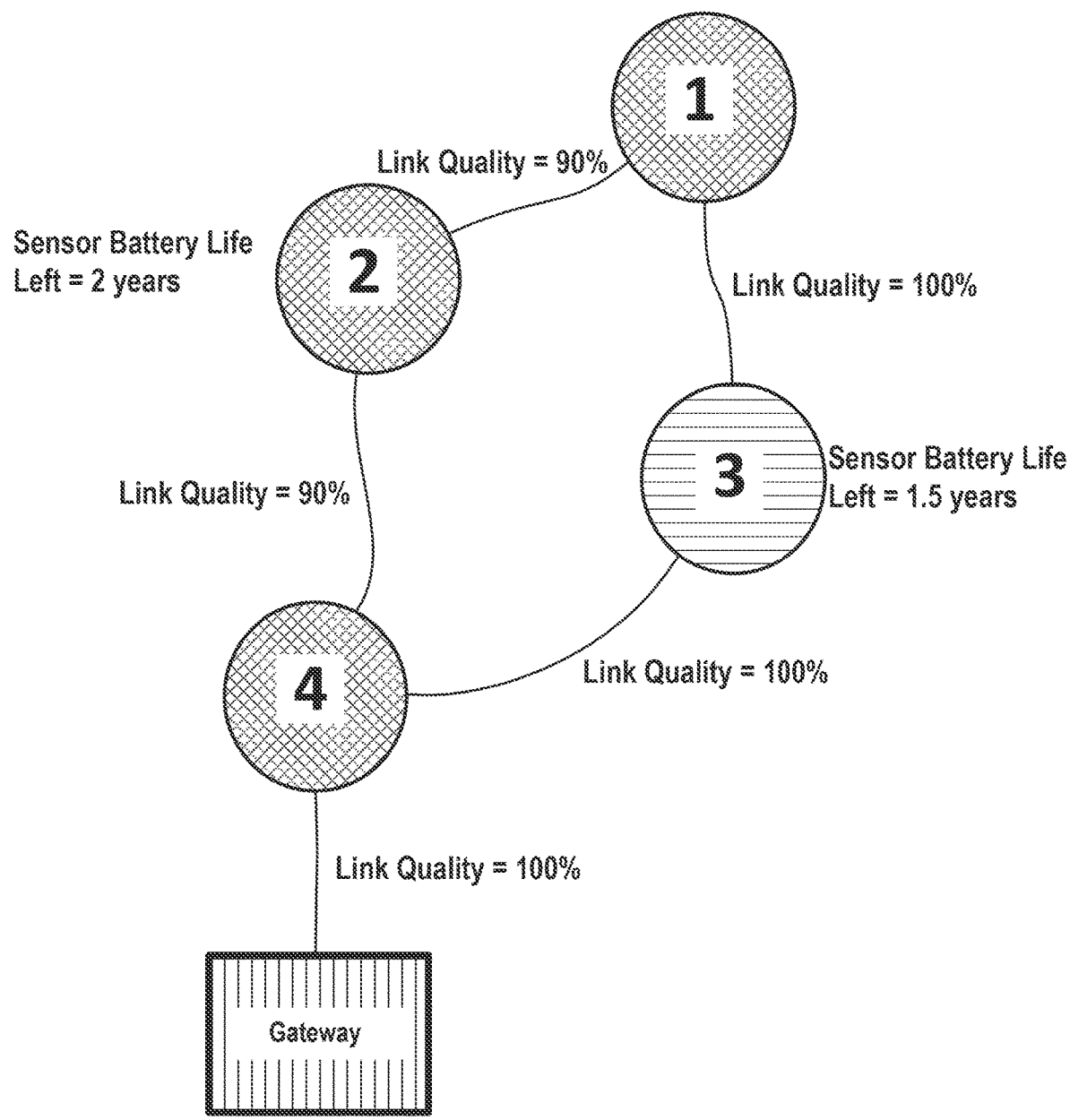
FIG. 3 shows an exemplary network with four nodes and a gateway, in accordance with various embodiments.

One of the largest problems for users of a wireless sensor system is the maintenance that involves replacing the batteries when the batteries are sufficiently depleted. For example, two years after a system is installed, 20% of the batteries may have lost sufficient energy and need to be replaced. As such, the user is constantly monitoring the system for batteries that are near their end of life and replacing the low power and/or dead batteries. To help reduce this problem, the system may monitor the life of the batteries in one or more of the sensors. In various embodiments, the system may estimate the remaining life in a battery based on voltage, current used and/or the internal resistance of the battery. The system may use an analog-to-digital (A2D) converter to convert battery voltage and current to digital readings. The digital readings may be sent to the gateway. The microcontroller on the sensor applies a known load to the battery using a MOSFET and measures the voltage drop with an A2D, such that the system may measure the internal resistance of the battery. In a single network, all the batteries may have the same life span and may all be replaced during the same maintenance function. As the battery life on some sensors becomes less than other sensors, if possible, the gateway may re-direct (e.g., by changing the way messages are routed through the system) network traffic passing through the sensors with less remaining life to sensors with more remaining battery life. For example, FIG. 3 shows 4 nodes and a gateway. The preferred route from node 1 to the gateway is through node 3. However, the gateway may detect that the battery for node 3 has lower energy than the battery for node 2, so the gateway re-routes the traffic from node 1 through node 2.

However, the network traffic at times may not be able to be re-routed because of the physical location of existing nodes being too far away (over a threshold distance) from other nodes, as shown in FIG. 7. If only one route is available through one node, that node can be overloaded as it is acting as a bridge to the network for multiple sensors. In addition to being too far away, the network traffic at times may not be able to be re-routed because of RF traffic or noise in the area, again making it such that there is only one node that can bridge a set of sensors back to the gateway. In the RF traffic or noise case, not enough clear RF time exists for a sensor to send messages. As such, the sensor uses the time the sensor has to get the sensor data out, but the sensor cannot get enough bandwidth to repeat messages. Sensors in this state end up at the end of the network, meaning that the sensors forward no messages. The threshold distance may depend on the RF noise in the area and the hardware design, as explained at www.bluetooth.com/learn-about-bluetooth/key-attributes/range/, which is hereby incorporated by reference in its entirety for all purposes.

In response to the nodes being over a threshold distance, the system sends a notification to the user that a "booster" should be added near the sensor carrying the high network load. The booster may be a node that can only transmit and receive messages. The booster may consist of the Tx/Rx wireless hardware, a battery, and a microcontroller. In various embodiments, boosters may already exist in the system, so the system may activate one or more boosters. The booster does not have the sensor power consumption load. Through this process, the gateway may better balance the life of the batteries in the system. In response to the booster being added, the booster sends a report to the gateway about the quality of its connections to its neighbors. The boosters may determine the quality of the connections similar to how the sensors determine the quality of connections, as discussed herein. Based on this quality data, the gateway may re-route messages from the over-tasked sensor to the booster.

In various embodiments, the system may provide the ability for the user to select multiple time durations between battery replacement maintenance functions. For example, two years, three years, or four years. The system may optimize itself over the course of each time period. The system may report the unused battery life for a given battery replacement duration to the user. The system may predict and report on the batteries that may not last the full duration. The optimization routine may suggest replacing certain partially or fully depleted batteries to minimize the batteries that may not last the full-time duration. This optimization routine may take days, weeks, or even months because different batteries may reach of low energy point during different time periods. The RF noise tends to change over time. For example, if teams are in the office on different days or equipment is only used for certain events, the system needs enough time to learn the periodicity. RF noise can cause the system to use more transmit power and have less bandwidth to use, as discussed earlier.

A battery replacement maintenance function may involve replacing all the sensors on a floor or in a building. During a battery replacement maintenance function, the system may identify the sensors that do not need their batteries replaced at that time. The user may select a time period until the next desired battery replacement maintenance, and based on that time period, the system predicts which sensors may not last that long and identifies such sensors for the user.

The predicting may be based upon the sensors periodically (e.g., every hour) sending power usage data to the gateway. The gateway stores the number of messages each sensor has sent and the route (e.g., list of nodes) of each message. The gateway uses this information to build a model of the power usage of the system. This model consists of the messages sent, the power used in each node by the sensors, the transmitter, the receivers, and the number of re-tries used to get messages through to the gateway. The number of re-tries may be a direct indicator of the RF noise in the environment. If no noise exists, the system does not need to send a message more than once, assuming the RF transmission is of sufficient power for the distance between the sensors. The system looks at the time that re-tries occur and builds a model with respect to the time and duration of these re-tries. For example, the RF noise is often larger in the middle of the day at some sites, and thus the re-tries are higher. Also, some customers have more people in the office Tuesday, Wednesday, and Thursday, and thus more RF noise and re-tries exist. Many sensors do not need to operate if there are no people near the sensors, so the sensors go to sleep mode. The sleep mode data is also included in the model because the sleeping sensors require much less energy than operating ones. The sleep mode data is also included in the temporal model as well because the system learns when people are expected to be present near each sensor.

Consider the example where there are 100 sensors on a floor of a building, wherein 50% of the sensors have one month of charge left, 20% have 6 months of charge left and the last 30% have three more years of charge left. The system provides a notice that, for a two-year cycle, 70% of the batteries should be replaced. The system may provide a list of each sensor that has a battery that should be replaced. The system may provide the option to perform another maintenance cycle within 6 months and only replace 50% of the batteries. Consider another example wherein, after the system has had new batteries installed for two years, the system provides a notification that indicates 50% of the batteries should be replaced this month. The user may select an additional two months until the next "replace battery" function, such that the system identifies 20% of the sensors that are not predicted to last for 2 more months.

In various embodiments, the network may detect the wireless frequencies of channels to determine the channels that have too much traffic (e.g., above a traffic threshold) and report the channels to a centralized location. The system performs the wireless monitoring by instructing each sensor to cycle through listening to each channel (e.g., when the sensor is idle) and reporting to the gateway the Clear Channel Time. The sensor may listen to channels and analyze the signals by the sensor switching the receiver to each channel in the operating range and listening for RF signals. This process may also be performed before transmitting as well. If there are no RF signals below a threshold, then the channel may be considered clear. For further information about clear channel assessment, see www.extremenetworks.com/resources/blogs/what-is-a-clear-channel-assessment-cca, which is hereby incorporated by reference in its entirety for all purposes. Clear Channel Time (CCT) is a function of the time a channel signal level is below a set threshold. The system may determine that too much traffic exists based on an industry standard of about 50% usage as full, but the system may still operate with more traffic. The system may generate a report of the state of the system. In response to detecting changes in the network that limit the network's ability to function or the changes in the network that add additional load to the batteries of the network, the sensors may compensate for the changes. With respect to the impacts on function and load, as the RF channels get crowded, the nodes may re-send messages more often. For example, certain devices/protocols may not check that the RF channel is clear before the devices/protocols use the RF channel. Also at times, a first transmitting device may not hear a second transmitting device, so if the second device is transmitting, the first transmitting device may broadcast over the second transmitting device. This situation may be referred to as a "hidden node" in the wireless literature. As the RF channels get full, the nodes may retransmit more as collisions occur. The system may also change the routing of messages to move traffic away from areas with high RF usage. The system may also notify the user about how the sensors adjusted to compensate for the changes. The system may obtain (and provide a report to the user about) the locations of all the sensors with respect to the physical location in the building, the channels/frequencies affected, the reduction in CCT and/or the increase in the channel signal level.

Figure 5:
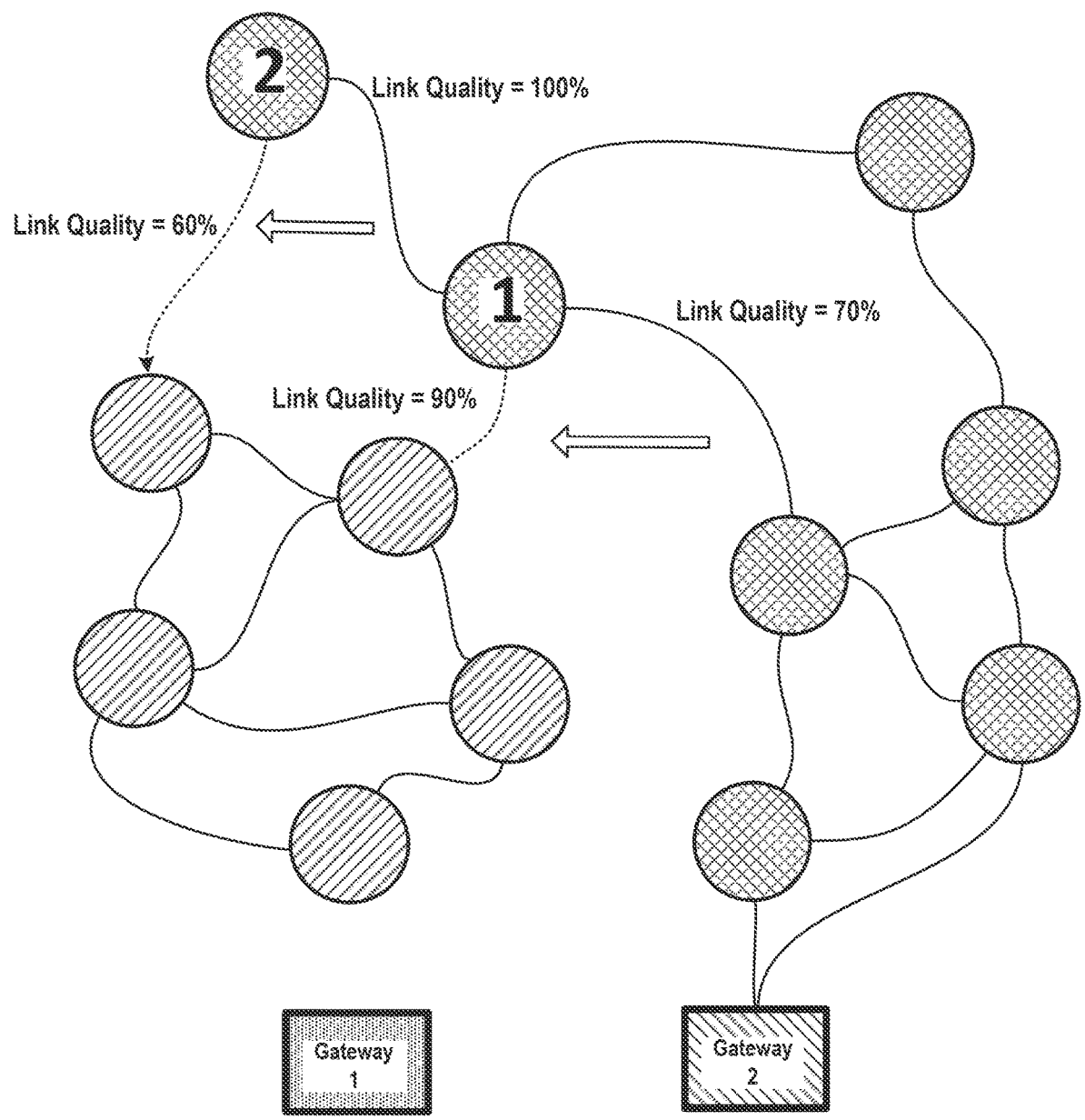
FIG. 5 shows an exemplary network that, after adding a second gateway to the system, balances the nodes across themselves by reducing the power for the transition at each node, in accordance with various embodiments.

In various embodiments, the system may load balance itself, in response to a second gateway being added to (or activated in) the network. In response to a second gateway being activated, the nodes may scan (e.g., periodically scan) for a better connection to the gateway than the current connection for the node. The gateway may determine that a better connection exists based on the amount of total power expended by the network to transmit messages from the node to the gateway. If a node does not receive an acknowledgement message after sending a message, the node may re-try and possibly increase the power. The gateway may track and notify the coordinator, if one exists, about the power any of the nodes are consuming to send messages to the gateway. As set forth in FIG. 5, two gateways balance the nodes across themselves by reducing the power for the transition at each node. The power may be reduced as the quality of the links improves, which in turn may reduce the number of re-transmission messages for getting to the next node, along with possibly reducing the transmission power. The quality of a link may be improved by a reduction in RF noise. With continued reference to FIG. 5, gateway 1 looks at each of the nodes in gateway 2 that can see nodes in gateway 1's network. Checking node 2 by itself the jump to gateway 1 is not better as node 2 has a link quality of 100% to node 1 and only 60% to gateway 1's network. Node 1 is seen to get an increase in link quality from 70% to 90% and thus is moved over. Once node 1 is moved over node 2 is forced over because it can now only communicate with nodes in gateway 1.

If a gateway determines that equal total power consumption may exist for a node on each of two gateways, the node may connect to the gateway with the least number of nodes attached to the gateway. The gateway may determine the number of nodes on the gateway. A node may not be getting all the messages through the system because, for example the RF noise reducing the link quality or the distance between two nodes is too large for the current transmit power. If the node is not getting all the messages through the system, the node may consume the maximum amount of power possible to get its messages through the system. The node may increase power consumption by increasing transmit power if its messages are not acknowledged by the receiving node. If a node is not getting any message acknowledgements from its adjacent nodes, the node may connect to any other available gateway.

In various embodiments, the system may include a second gateway. Such a second gateway may allow the system to reduce the number of hops needed for communication between the nodes and a gateway. The reduction of hops reduces energy and latency. The hops may consume more energy and latency because each message consumes the transmit energy and the time it takes to transmit and acknowledge a message. Moreover, multiple gateways add redundancy in case one gateway is compromised. Furthermore, additional gateways may increase the system's ability to reform the network around areas with a high RF noise level in the space covered by the network, wherein the RF noise causes messages to fail and not be received correctly. The system may optimize these benefits by prioritizing the connection of nodes and then the energy usage of the nodes.

In various embodiments, the system may identify locations and suggest locations where it may be beneficial to add another gateway. In particular, the system may analyze the energy consumed sending messages from each node to the gateway. If the energy consumed by a number of nodes exceeds a certain energy threshold, then the system recommends the addition of another gateway in an area near those nodes that consume excessive energy. The threshold amount may be based on the batteries of these nodes needing to be replaced before the rest of the system's batteries.

In various embodiments, the system may identify gateways that may be removed from the system without (or with minimal) impact on network performance. The system may suggest removing such identified gateways. In particular, the individual nodes may estimate the additional power to connect to their nearest neighbors. This power information may be sent to the gateway, along with information about the power consumption of the existing network. The gateways may send that power information to the coordinator. The coordinator may combine this power information to determine if nodes should move from a first gateway to a second gateway, then the system may remove the first gateway. After the system determines that a gateway should be removed, the system may determine the best place to move the removed gateway. The system may also estimate the increase in system performance, in response to moving or removing the gateway.

In various embodiments, the network containing wireless sensors and boosters may be connected by wire (ethernet) directly between two nodes in the network with no network switch. This wire may allow long distances to be connected with low-power communication. The wire may also allow communication through walls and in areas where there is a high level of wireless noise.

In various embodiments, the system may use data about a floor plan with desired sensor locations to suggest initial placement locations for gateways, boosters and sensors. The suggestions may be based on information provided by the user. In particular, the system obtains the location of the sensors and the walls. The system also obtains the material of the walls as a percentage of RF transparency. The system uses this information (and may use machine learning) to determine the optimal location of the gateways with respect to the geometry of the room and the sensors. The determination is based on balancing the hive placement and booster placement such that the battery consumption load on all the sensors is optimal. Battery life may be estimated based on known RF models for the links between the sensors and the RF transparency of the obstacles between the sensors, boosters and gateway.

In various embodiments, the system may receive additional inputs such as locations of walls, RF conductivity of walls and allowable gateway placement locations. In various embodiments, the system may estimate RF conductivity based on wall material (e.g., cement or wallboard) and thickness. These inputs may be obtained by generating a 2D drawing of the space (e.g., in the front-end interface), specifying the geometry of the building and specifying the placement of the sensors in that space. The system may define the walls and other geometry as the same material as other geometry already in the system.

In various embodiments, the system may perform a method of determining the transparency of walls by placing multiple sensors in measured locations in an area and providing the system with the geometry of the room, floor, ceiling height and walls. The measurements of the sensor locations may be with respect to the geometry of the room and each other. The system may run an environment test. Where two or more nodes are placed in measured locations with respect to each other and the building geometry, the nodes may communicate with each other. The quality of the links found between the nodes may be used to determine the effect of the building geometry. In various embodiments, the system may predict the RF opaqueness (in terms of RF transparency) of the entities between the sensors. The system may store this RF opaqueness information for the tested geometry and re-use the information.

In various embodiments, the system may provide a visualization of the wireless network connections and information about the connections (e.g., link quality, data throughput) on a map or floor plan, given known locations of sensors and gateways.

In various embodiments, the system may include self-healing capabilities. In particular, the system may identify and isolate problematic sensors or gateways. The system may re-route network traffic accordingly to maintain network connectivity and performance. To determine problems, the system may monitor the energy used by each link in the network, as well as the number of packets that are dropped in each link. Determining dropped packets may involve the sender node not receiving an acknowledgement from the receiver node. The system may determine that an increase in energy or packet loss indicates a problem with either the system hardware or the environment. The problem may be in the environment when RF noise is created by some other devices or in the hardware where the transmission or receive hardware malfunctions. The problems may also include the antennas being faulty or removed, or the device may be moved to a location where RF signals are blocked because of metal encasements. The system may automatically initiate self-healing processes (e.g., re-routing, etc.), in response to detected network issues, without requiring user intervention.

In various embodiments, the system may utilize machine learning algorithms or artificial intelligence to optimize the self-healing processes and continuously improve network performance. The system may train the machine learning model by using historic data from the system. The historic data may include, for example, the total energy used for transmission and the node-to-node configuration of the network. The machine learning may also use other factors such as, for example, noise, latency, power reduction, RF signals, RF opaqueness, conductivity, wall placement etc. In response to the system detecting problems that the existing logic may not work around, the system may randomly change the connections in the network and determine a better connection. The better connection may be based on the goal to minimize the total energy consumption.

More specifically, the system may train a neural network when using artificial intelligence or machine learning. The system may include an expanded data set of past data to train the neural network. The expanded training set may be developed by applying mathematical algorithms to the acquired set of data. The neural network is then trained with the expanded data set using a machine learning algorithm that uses a mathematical function to adjust certain weighting. The system may also use an iterative training algorithm to re-train with additional data.

In various embodiments, the wireless network may comprise a user interface for managing and monitoring network performance. The user interface may include displaying, for example, network topology, traffic load, battery life, and self-healing status. The user interface may contain information about the estimated RF transparency of the obstacles between the nodes, the external RF signals that are in the area of each sensor and/or the times that the RF signals are detected. The external RF signals may be benign, but if there are enough of the RF signals, then the time available for nodes to send data gets constrained and the RF signals may transmit while the nodes are transmitting, and the messages may get dropped.

In various embodiments, the sensors in the system may automatically adjust or update the rate at which the sensors sample data to save power. The updating of the rate may include running at a low sample rate (e.g., once per 10 seconds). In response to the sensor measurements following a specific profile, the sensor may increase the sample rate. For example, in response to a temperature sensor recording thermal profiles above a certain temperature, the sensor "wakes up" and begins to increase the sample rate to detect the temperature values of the room.

In various embodiments, the physically neighboring sensors in a network may send a signal to their neighbors to increase their sample rate, in response to certain conditions being met. For example, when some or all of the sensors in a room are trying to detect a person to predict desk occupancy, at least a subset of the sensors may run in low power mode. In response to one sensor detecting a person, the coordinator may send a signal out to all (or a subset of) the sensors in the room to "wake up" and operate at their normal sample rate (e.g., 10 times a second).

In various embodiments, the system may use multiple sensors in the same node. In particular, a lower power consumption sensor and a higher power consumption sensor. The lower power consumption sensor may activate the high-power sensor, in response to certain conditions being met. For example, a Passive InfraRed (PIR) sensor may consume much less power than a pixelated thermopile sensor. However, the PIR sensor may not detect the difference between one person and many people, or where those people are located with respect to the sensor. A single node attached to a PIR sensor and a thermopile sensor may monitor the area of interest and activate the thermopile sensor, in response to detecting certain activity.

In various embodiments, the system may be scalable. For example, the system may support a large number of sensors and gateways. The system may be deployed in a variety of environments and applications. The secure communication protocol may include encryption mechanisms and/or authentication mechanisms that minimize or prevent eavesdropping and/or tampering with network data. The system may perform over-the-air updates to update the firmware and/or add new features, without requiring physical access to the sensors or gateways. The system may include fault tolerance mechanisms to ensure continued operation, in the event of component failure or network congestion. The system may include a backup power source to ensure continued operation, in the event of power outages or other disruptions to the primary power supply (that supplies power to the gateway).

In various embodiments, the system may deploy different optimization schemes to overcome the adverse effect of interference. For example, using nominal estimates (without specific measurements of the space that the system is deployed in), the system may be deployed by refining the positions of the gateways and boosters using the measurements of the system. The measurements may help refine by providing the user the information about what to change or add. For example, two sensors may exist on one side of a wall, and a gateway and a booster on the other side of the wall, and nothing else interacting with the system. The two sensors may have a good link quality between the sensors, and the booster and gateway may have a good link quality, but the link quality through the wall between the sensors and the gateway/booster may be much lower. As such, the system may move the booster as close to the wall as possible to increase the link quality and possibly add a second booster on the opposite or sensor side of the wall. The boosters may be placed to "power" though the walls or around the walls. The power needed to get through the wall may depend on the wall, in that some walls (wallboard) are completely transparent, while other walls may include cement with rebar, so the power may not go through those types of walls. With the more RF blocking wall materials, boosters and RF openings may be needed to send the power through or around those walls. The system may further adapt to environmental noise by moving the gateway, moving the boosters, adding more boosters or adding more gateways. For example, in an area that generates RF noise (e.g., a meeting room where lots of people are in a small area with many devices, or near a kitchen where microwaves are in use), the system may notify the user that placing the gateway near this area is worse than placing the gateway on the other side of the office building where there are no such effects. The system may also incorporate different optimization schemes to deploy groups of sensors in the network that are experiencing different levels of interference. The interference that a node is experiencing may be measured by a metric consisting of the power needed to overcome the noise at a specific frequency and the number of messages that are not acknowledged by the receiving node.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not for purposes of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. An individual component may be comprised of two or more smaller components that may provide a similar functionality as the individual component. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. For example, the description or claims may refer to a processor for convenience, but the invention and claim scope contemplates that the processor may be multiple processors. The multiple processors may handle separate tasks or combine to handle certain tasks. Although specific advantages have been enumerated herein, various embodiments may include some, none, or all of the enumerated advantages.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

The system may include remote access to data, standardizing data and allowing remote users to share information in real time. The system may allow users to access data (e.g., data from the sensors) in a user interface, and receive updated data in real time from other users. The system may store the data (e.g., in a non-standardized format) in a plurality of storage devices, provide remote access over a network so that users may update the data that was in a non-standardized format (e.g., dependent on the hardware and software platform used by the user) in real time through a GUI, convert the updated data that was input (e.g., by a user) in a non-standardized form to the standardized format, automatically generate a message (e.g., containing the updated data) whenever the updated data is stored and transmit the message to the users over a computer network in real time, so that the user has immediate access to the up-to-date data. The system may allow remote users to share data in real time in a standardized format, regardless of the format (e.g., non-standardized) that the information was input by the user.

In various embodiments, the system may send a signal to a system to allow the user to obtain goods or services from a supplier. The system may generate an authorized purchase message to send to a portal (e.g., a kiosk, a gate, a locker, an area, etc.). The portal may activate a motor, a door and/or a lever to allow the provider access to retrieve a purchased item and/or leave an area with the purchased item. The system may then transmit the authorized purchase message to the portal. The portal may verify certain data in the authorized purchase message, and based on the verification, the portal may grant the customer access to the purchased item. In various embodiments, access to the purchased item may include opening a door, lifting a gate, providing access to an area, displaying a product, rotating a platform, dispensing a product and/or causing other mechanical or physical access that allows the user to take the purchased item and/or leave the inventory area.

The system may include a filtering tool that is remote from the end user and provides customizable filtering features to each end user. The filtering tool may provide customizable filtering by filtering access to the data. The filtering tool may identify data, sensors, gateways, boosters, etc. that communicate with the server and may associate a request for content with the individual device. The system may include a filter on a local computer and a filter on a server. The filtering tool may identify information or accounts that communicate with the server, and associate a request for content with the individual account. The system may include a filter on a local computer and a filter on a server.

The system may store elements from different host websites (or user interfaces) in a database, then when a user accesses the database, the system may provide a hybrid webpage (or user interface) that merges content or documents from the different host websites (or user interfaces). Upon access, the system may merge the content from the various websites (or user interfaces) and provide a link to the user to access the merged data in the form of an image-based document.

The system may allow users to access data, and receive updated data in real time from other users. The system may store the data (e.g., in a standardized format) in a plurality of storage devices, provide remote access over a network so that users may update the data in a non-standardized format (e.g., dependent on the hardware and software platform used by the user) in real time through a GUI, convert the updated data that was input (e.g., by a user) in a non-standardized form to the standardized format, automatically generate a message (e.g., containing the updated data) whenever the updated data is stored and transmit the message to the users over a computer network in real time, so that the user has immediate access to the up-to-date data. The system allows remote users to share data in real time in a standardized format, regardless of the format (e.g., non-standardized) that the information was input by the user. The system may also include a filtering tool that is remote from the end user and provides customizable filtering features to each end user. The filtering tool may provide customizable filtering by filtering access to the data. The filtering tool may identify data or accounts that communicate with the server and may associate a request for content with the individual account. The system may include a filter on a local computer and a filter on a server.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodically, randomly, once, more than once, or in response to a suitable request or action. Any of the information may be distributed and/or accessed via a software enabled link, wherein the link may be sent via an email, text, post, social network input, and/or any other method.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments are expressly incorporated herein by reference and are intended to be encompassed by the present claims. Moreover, it is not necessary for a device or method to address each and every problem sought to be solved by the present disclosure for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112 (f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The process flows and screenshots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements, but also to the various system components as described herein. It should be understood that, although exemplary embodiments are illustrated in the figures and described herein, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

In various embodiments, software may be stored in a computer program product and loaded into a computer system using a removable storage drive, hard disk drive, or communications interface. The control logic (software), when executed by the processor, causes the processor to perform the functions of various embodiments as described herein. In various embodiments, hardware components may take the form of application specific integrated circuits (ASICs). Implementation of the hardware so as to perform the functions described herein will be apparent to persons skilled in the relevant art(s).

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY DISC®, optical storage devices, magnetic storage devices, and/or the like.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® company's operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of techniques for data transmission, signaling, data processing, network control, and the like. Still further, the system could be used to detect or prevent security issues with a client-side scripting language, such as JAVASCRIPT®, VBScript, or the like.

The system and method are described herein with reference to screen shots, block diagrams and flowchart illustrations of methods, apparatus, and computer program products according to various embodiments. It will be understood that each functional block of the block diagrams and the flowchart illustrations, and combinations of functional blocks in the block diagrams and flowchart illustrations, respectively, can be implemented by computer program instructions.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS® applications, webpages, websites, web forms, prompts, etc. Practitioners will appreciate that the illustrated steps described herein may comprise, in any number of configurations, including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, the software elements of the system may also be implemented using a JAVASCRIPT® run-time environment configured to execute JAVASCRIPT® code outside of a web browser. For example, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager, such as, for example, Parallel Multithreaded Machine ("PM2"); a resource and performance monitoring tool, such as, for example, Node Application Metrics ("appmetrics"); a library module for building user interfaces, and/or any other suitable and/or desired module.

Middleware may include any hardware and/or software suitably configured to facilitate communications and/or process transactions between disparate computing systems. Middleware components may be contemplated. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERE® MQ™ (formerly MQSeries) by IBM®, Inc. (Armonk, NY) is an example of a commercially available middleware product. An Enterprise Service Bus ("ESB") application is another example of middleware.

The computers discussed herein may provide a suitable website or other internet-based graphical user interface which is accessible by users. In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

For the sake of brevity, data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

In various embodiments, the system and various components may integrate with one or more smart digital assistant technologies. For example, exemplary smart digital assistant technologies may include the ALEXA® system developed by the AMAZON® company, the GOOGLE HOME® system developed by Alphabet, Inc., the HOMEPOD® system of the APPLE® company, and/or similar digital assistant technologies. The ALEXA® system, GOOGLE HOME® system, and HOMEPOD® system, may each provide cloud-based voice activation services that can assist with tasks, entertainment, general information, and more. All the ALEXA® devices, such as the AMAZON ECHO®, AMAZON ECHO DOT®, AMAZON TAP®, and AMAZON FIRE® TV, have access to the ALEXA® system. The ALEXA® system, GOOGLE HOME® system, and HOMEPOD® system may receive voice commands via its voice activation technology, activate other functions, control smart devices, and/or gather information. For example, the smart digital assistant technologies may be used to interact with music, emails, texts, phone calls, question answering, home improvement information, smart home communication/activation, games, shopping, making to-do lists, setting alarms, streaming podcasts, playing audiobooks, and providing weather, traffic, and other real time information, such as news. The ALEXA®, GOOGLE HOME®, and HOMEPOD® systems may also allow the user to access information about eligible transaction accounts linked to an online account across all digital assistant-enabled devices.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various support software and drivers typically associated with computers.

The present system or any part(s) or function(s) thereof may be implemented using hardware, software, or a combination thereof and may be implemented in one or more computer systems or other processing systems. However, the manipulations performed by embodiments may be referred to in terms, such as matching or selecting, which are commonly associated with mental operations performed by a human operator. No such capability of a human operator is necessary, or desirable, in most cases, in any of the operations described herein. Rather, the operations may be machine operations or any of the operations may be conducted or enhanced by artificial intelligence (AI) or machine learning. AI may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices. The AI or ML may store data in a decision tree in a novel way.

In various embodiments, the embodiments are directed toward one or more computer systems capable of carrying out the functionalities described herein. The computer system includes one or more processors. The processor is connected to a communication infrastructure (e.g., a communications bus, cross-over bar, network, etc.). Various software embodiments are described in terms of this exemplary computer system. After reading this description, it will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit.

The computer system also includes a main memory, such as random access memory (RAM), and may also include a secondary memory. The secondary memory may include, for example, a hard disk drive, a solid-state drive, and/or a removable storage drive. The removable storage drive reads from and/or writes to a removable storage unit. As will be appreciated, the removable storage unit includes a computer usable storage medium having stored therein computer software and/or data.

In various embodiments, secondary memory may include other similar devices for allowing computer programs or other instructions to be loaded into a computer system. Such devices may include, for example, a removable storage unit and an interface. Examples of such may include a program cartridge and cartridge interface (such as that found in video game devices), a removable memory chip (such as an erasable programmable read only memory (EPROM), programmable read only memory (PROM)) and associated socket, or other removable storage units and interfaces, which allow software and data to be transferred from the removable storage unit to a computer system.

The terms "computer program medium," "computer usable medium," and "computer readable medium" are used to generally refer to media such as removable storage drive and a hard disk installed in hard disk drive. These computer program products provide software to a computer system.

The computer system may also include a communications interface. A communications interface allows software and data to be transferred between the computer system and external devices. Examples of such a communications interface may include a modem, a network interface (such as an Ethernet card), a communications port, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16-bit integers.

In various embodiments, the server may include application servers (e.g., WEBSPHERE®, WEBLOGIC®, JBOSS®, POSTGRES PLUS ADVANCED SERVER®, etc.). In various embodiments, the server may include web servers (e.g., Apache, IIS, GOOGLE® Web Server, SUN JAVA® System Web Server, JAVA® Virtual Machine running on LINUX® or WINDOWS® operating systems).

A web client includes any device or software which communicates via any network, such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various support software and drivers typically associated with computers. The web-client may also run MICROSOFT® INTERNET EXPLORER® software, MOZILLA® FIREFOX® software, GOOGLE CHROME™ software, APPLE® SAFARI® software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

The various system components may be independently, separately, or collectively suitably coupled to the network via data links which includes, for example, a connection to an Internet Service Provider (ISP) over the local loop as is typically used in connection with standard modem communication, cable modem, DISH NETWORK®, ISDN, Digital Subscriber Line (DSL), or various wireless communication methods. It is noted that the network may be implemented as other types of networks, such as an interactive television (ITV) network. Moreover, the system contemplates the use, sale, or distribution of any goods, services, or information over any network having similar functionality described herein.

The system contemplates uses in association with web services, utility computing, pervasive and individualized computing, security and identity solutions, autonomic computing, cloud computing, commodity computing, mobility and wireless solutions, open source, biometrics, grid computing, and/or mesh computing.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT And XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. For example, representational state transfer (REST), or RESTful, web services may provide one way of enabling interoperability between applications.

The computing unit of the web client may be further equipped with an internet browser connected to the internet or an intranet using standard dial-up, cable, DSL, or any other internet protocol. Transactions originating at a web client may pass through a firewall in order to prevent unauthorized access from users of other networks. Further, additional firewalls may be deployed between the varying components of CMS to further enhance security.

Encryption may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic curve cryptography (e.g., ECC, ECDH, ECDSA, etc.), and/or other post-quantum cryptography algorithms under development.

The firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the internet. A firewall may be integrated as software within an internet server or any other application server components, reside within another computing device, or take the form of a standalone hardware component.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, NY), various database products available from ORACLE® Corporation (Redwood Shores, CA), MICROSOFT ACCESS® or MICROSOFT SQL SERVER® by MICROSOFT® Corporation (Redmond, Washington), MYSQL® by MySQL AB (Uppsala, Sweden), MONGODB®, Redis, APACHE CASSANDRA®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

Association of certain data may be accomplished through various data association techniques. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with various embodiments, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with the system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored may be provided by a third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions, such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data, but instead the appropriate action may be taken by providing to the user, at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database or system includes any of various suitable security features, such as firewalls, access codes, encryption, decryption, compression, decompression, and/or the like.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The data may be big data that is processed by a distributed computing cluster. The distributed computing cluster may be, for example, a HADOOP® software cluster configured to process and store big data sets with some of nodes comprising a distributed storage system and some of nodes comprising a distributed processing system. In that regard, distributed computing cluster may be configured to support a HADOOP® software distributed file system (HDFS) as specified by the Apache Software Foundation at www.hadoop.apache.org/docs.

As used herein, the term "network" includes any cloud, cloud computing system, or electronic communications system or method which incorporates hardware and/or software components. Communication among the parties may be accomplished through any suitable communication channels, such as, for example, a telephone network, an extranet, an intranet, internet, point of interaction device (point of sale device, personal digital assistant (e.g., an IPHONE® device, a BLACKBERRY® device), cellular phone, kiosk, etc.), online communications, satellite communications, off-line communications, wireless communications, transponder communications, local area network (LAN), wide area network (WAN), virtual private network (VPN), networked or linked devices, keyboard, mouse, and/or any suitable communication or data input modality. Moreover, although the system is frequently described herein as being implemented with TCP/IP communications protocols, the system may also be implemented using IPX, APPLETALK® program, IP-6, NetBIOS, OSI, any tunneling protocol (e.g., IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the internet may be contemplated.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

As used herein, "transmit" may include sending electronic data from one system component to another over a network connection. Additionally, as used herein, "data" may include encompassing information such as commands, queries, files, data for storage, and the like in digital or any other form.

Any database discussed herein may comprise a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus-based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones, Internet of Things devices ("IoT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network.

Data transfers performed through the blockchain-based system may propagate to the connected peers within the blockchain network within a duration that may be determined by the block creation time of the specific blockchain technology implemented. For example, on an ETHEREUM®-based network, a new data entry may become available within about 13-20 seconds as of the writing. On a HYPERLEDGER® Fabric 1.0 based platform, the duration is driven by the specific consensus algorithm that is chosen, and may be performed within seconds. In that respect, propagation times in the system may be improved compared to existing systems, and implementation costs and time to market may also be drastically reduced. The system also offers increased security at least partially due to the immutable nature of data that is stored in the blockchain, reducing the probability of tampering with various data inputs and outputs. Moreover, the system may also offer increased security of data by performing cryptographic processes on the data prior to storing the data on the blockchain. Therefore, by transmitting, storing, and accessing data using the system described herein, the security of the data is improved, which decreases the risk of the computer or network from being compromised.

In various embodiments, the system may also reduce database synchronization errors by providing a common data structure, thus at least partially improving the integrity of stored data. The system also offers increased reliability and fault tolerance over traditional databases (e.g., relational databases, distributed databases, etc.) as each node operates with a full copy of the stored data, thus at least partially reducing downtime due to localized network outages and hardware failures. The system may also increase the reliability of data transfers in a network environment having reliable and unreliable peers, as each node broadcasts messages to all connected peers, and, as each block comprises a link to a previous block, a node may quickly detect a missing block and propagate a request for the missing block to the other nodes in the blockchain network.

The particular blockchain implementation described herein provides improvements over technology by using a decentralized database and improved processing environments. In particular, the blockchain implementation improves computer performance by, for example, leveraging decentralized resources (e.g., lower latency). The distributed computational resources improves computer performance by, for example, reducing processing times. Furthermore, the distributed computational resources improves computer performance by improving security using, for example, cryptographic protocols.

Any communication, transmission, and/or channel discussed herein may include any system or method for delivering content (e.g., data, information, metadata, etc.), and/or the content itself. The content may be presented in any form or medium, and in various embodiments, the content may be delivered electronically and/or capable of being presented electronically. For example, a channel may comprise a website, mobile application, or device (e.g., FACEBOOK®, YOUTUBE®, PANDORA®, APPLE TV®, MICROSOFT® XBOX®, ROKU®, AMAZON FIRE®, GOOGLE CHROMECAST™, SONY® PLAYSTATION®, NINTENDO® SWITCH®, etc.) a uniform resource locator ("URL"), a document (e.g., a MICROSOFT®) Word or EXCEL™, an ADOBE® Portable Document Format (PDF) document, etc.), an "ebook," an "emagazine," an application or microapplication (as described herein), an short message service (SMS) or other type of text message, an email, a FACEBOOK® message, a TWITTER® tweet, multimedia messaging services (MMS), and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network, and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, LINKEDIN®, INSTAGRAM®, PINTEREST®, TUMBLR®, REDDIT®, SNAPCHAT®, WHATSAPP®, FLICKR®, VK®, QZONE®, WECHAT®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

The invention claimed is:

1. A method comprising:
applying a known load to a battery for a first sensor, wherein the first sensor is connected to a first node that is in a mesh network of a plurality of nodes,
wherein a first gateway controls a first subset of the plurality of nodes,
wherein the first gateway is in the mesh network with a plurality of gateways,
wherein a coordinator coordinates the plurality of gateways, and
wherein each of a plurality of sensors are respectively connected to each of the plurality of nodes;
measuring a voltage drop in the battery;
determining an internal resistance of the battery;
estimating a remaining life in the battery based on the internal resistance;
in response to the remaining life in the battery being below a remaining life threshold, re-directing, by the first gateway, signals in the mesh network away from the first node and to one or more of the plurality of nodes interfacing with the first node;
in response to analyzing messages between the first subset of the plurality of nodes in a vicinity, determining, by the coordinator, a strongest connection to a second subset of the plurality of nodes on a second gateway to facilitate load balancing,
wherein the coordinator determines the strongest connection based on a combination of a predicted power used by the first sensor, a network connection of the first sensor to the first gateway, and a number of dropped packets by the first sensor; and
moving the first subset of the plurality of nodes to the second gateway by commanding the first sensor to connect to one of the second subset of the plurality of nodes on the second gateway.

2. The method of claim 1, further comprising, in response to the first node receiving messages from the plurality of gateways, connecting by the first node to one of the plurality of gateways with a strongest signal strength.

3. The method of claim 1, further comprising:
determining that the first node is a threshold distance from the one or more of the plurality of nodes; and
sending a notification to a user interface to at least one of add or activate a booster in the mesh network, wherein the booster interfaces with the one or more of the plurality of nodes and the first gateway.

4. The method of claim 1, further comprising:
at least one of adding or activating a booster in the mesh network, in response to the first node being a threshold distance from the one or more of the plurality of nodes, wherein the booster interfaces with the one or more of the plurality of nodes and the first gateway; and
re-routing messages from the first node to the booster.

5. The method of claim 1, wherein the coordinator maintains a state of the mesh network including physical locations of the plurality of gateways and physical locations of the plurality of nodes, maintains information about a geometry and construction of a building housing the mesh network, maintains information about a quality of connections between each node of the plurality of nodes and each gateway of the plurality of gateways, load balance the plurality of gateways and suggest physical improvements to the mesh network.

6. The method of claim 1, further comprising adding an extension sensor interfacing with one or more of the plurality of nodes.

7. The method of claim 1, wherein the one or more of the plurality of nodes operate on at least one of a time slot or a frequency channel.

8. The method of claim 1, wherein the first gateway is configured to provide beacon messages that enable at least one of the first node to connect to the first gateway or the one or more of the plurality of nodes to indirectly connect to the first gateway.

9. The method of claim 1, wherein the one or more of the plurality of nodes re-broadcast beacon messages to allow other nodes to join a mesh network.

10. The method of claim 1, wherein the first node reports to the first gateway at least one of a quality of connection to the one or more of the plurality of nodes, the one or more of the plurality of nodes detected by the first node or signal strength of a message sent by the first node.

11. The method of claim 1, further comprising at least one of determining or adjusting the remaining life threshold based on receiving a selection of a time duration between battery replacement maintenance functions.

12. The method of claim 1, further comprising predicting the remaining life threshold based on a time duration between battery replacement maintenance functions.

13. The method of claim 1, wherein the re-directing the signals is further based upon determining channels that have signal traffic at least one of above or below a traffic threshold.

14. The method of claim 13, further comprising determining a clear channel time (CCT) to determine that the signal traffic is below the traffic threshold.

15. The method of claim 1, wherein the re-directing the signals is further based upon load balancing, in response to at least one of adding or removing a second gateway from the mesh network.

16. The method of claim 1, further comprising determining locations in the mesh network to add a second gateway, in response to the one or more of the plurality of nodes exceeding an energy threshold.

17. The method of claim 1, further comprising suggesting placement locations for at least one of the first node, the first gateway, a booster or the one or more of the plurality of nodes, based on wall information.

18. The method of claim 1, further comprising determining a radio frequency (RF) opaqueness in terms of RF transparency, based on a geometry of a room containing the mesh network.

19. An article of manufacture including one or more non-transitory, tangible computer readable storage mediums having instructions stored thereon that, in response to execution by a sensor system, cause the sensor system to perform operations comprising:
applying a known load to a battery for a first sensor, wherein the first sensor is connected to a first node that is in a mesh network of a plurality of nodes,
wherein a first gateway controls a first subset of the plurality of nodes,
wherein the first gateway is in the mesh network with a plurality of gateways,
wherein a coordinator coordinates the plurality of gateways, and
wherein each of a plurality of sensors are respectively connected to each of the plurality of nodes;
measuring a voltage drop in the battery;
determining an internal resistance of the battery;
estimating a remaining life in the battery based on the internal resistance;
in response to the remaining life in the battery being below a remaining life threshold, re-directing, by the first gateway, signals in the mesh network away from the first node and to one or more of the plurality of nodes interfacing with the first node;
in response to analyzing messages between the first subset of the plurality of nodes in a vicinity, determining, by the coordinator, a strongest connection to a second subset of the plurality of nodes on a second gateway to facilitate load balancing,
wherein the coordinator determines the strongest connection based on a combination of a predicted power used by the first sensor, a network connection of the first sensor to the first gateway, and a number of dropped packets by the first sensor; and
moving the first subset of the plurality of nodes to the second gateway by commanding the first sensor to connect to one of the second subset of the plurality of nodes on the second gateway.

20. A sensor system comprising:
one or more processors; and
one or more tangible, non-transitory memories configured to communicate with the one or more processors,
the one or more tangible, non-transitory memories having instructions stored thereon that, in response to execution by the one or more processors, cause the one or more processors to perform operations comprising:
applying a known load to a battery for a first sensor, wherein the first sensor is connected to a first node that is in a mesh network of a plurality of nodes,
wherein a first gateway controls a first subset of the plurality of nodes,
wherein the first gateway is in the mesh network with a plurality of gateways,
wherein a coordinator coordinates the plurality of gateways, and
wherein each of a plurality of sensors are respectively connected to each of the plurality of nodes;
measuring a voltage drop in the battery;
determining an internal resistance of the battery;

estimating a remaining life in the battery based on the internal resistance;

in response to the remaining life in the battery being below a remaining life threshold, re-directing, by the first gateway, signals in the mesh network away from the first node and to one or more of the plurality of nodes interfacing with the first node;

in response to analyzing messages between the first subset of the plurality of nodes in a vicinity, determining, by the coordinator, a strongest connection to a second subset of the plurality of nodes on a second gateway to facilitate load balancing, wherein the coordinator determines the strongest connection based on a combination of a predicted power used by the first sensor, a network connection of the first sensor to the first gateway, and a number of dropped packets by the first sensor; and moving the first subset of the plurality of nodes to the second gateway by commanding the first sensor to connect to one of the second subset of the plurality of nodes on the second gateway.

* * * * *